UNITED STATES PATENT OFFICE.

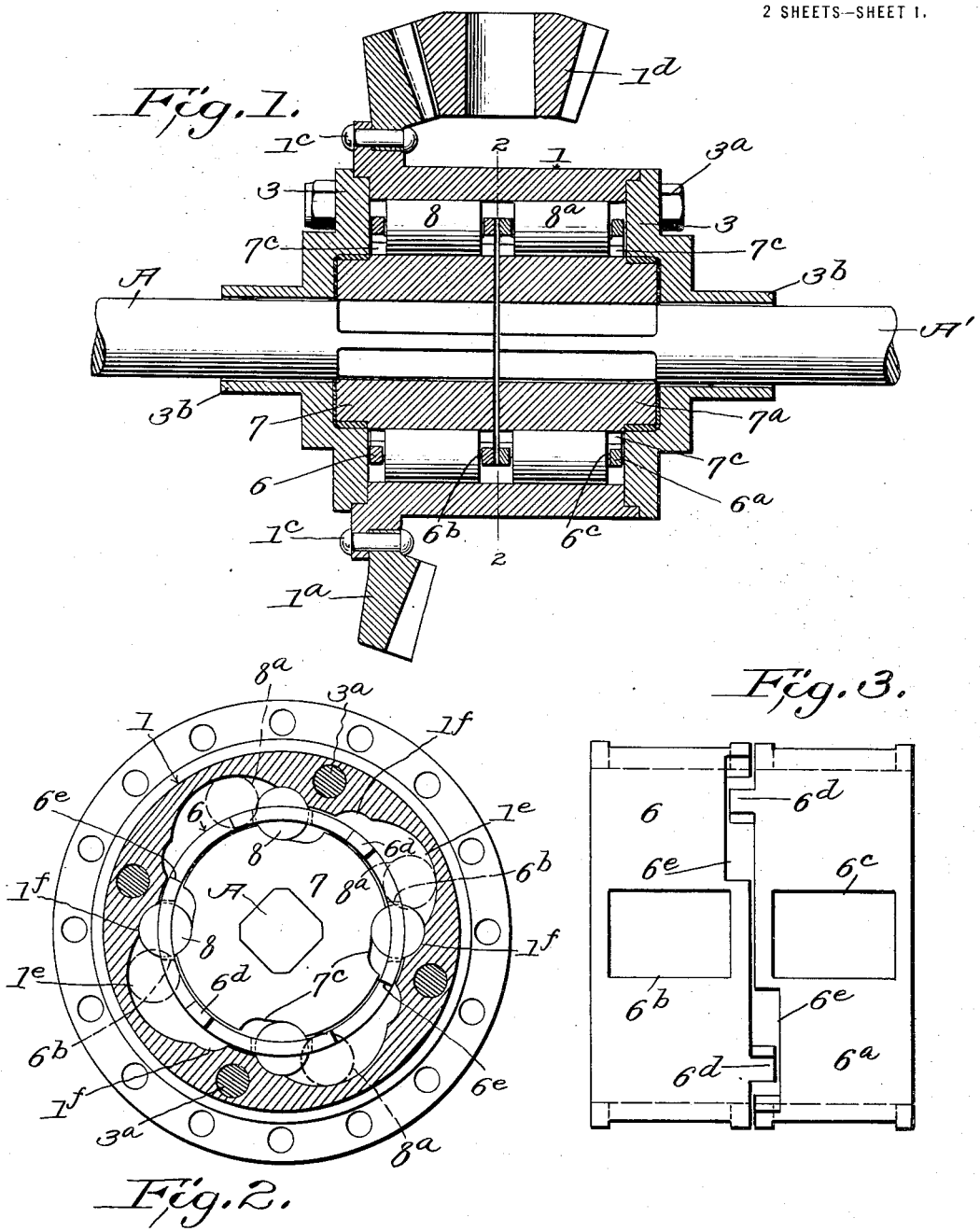

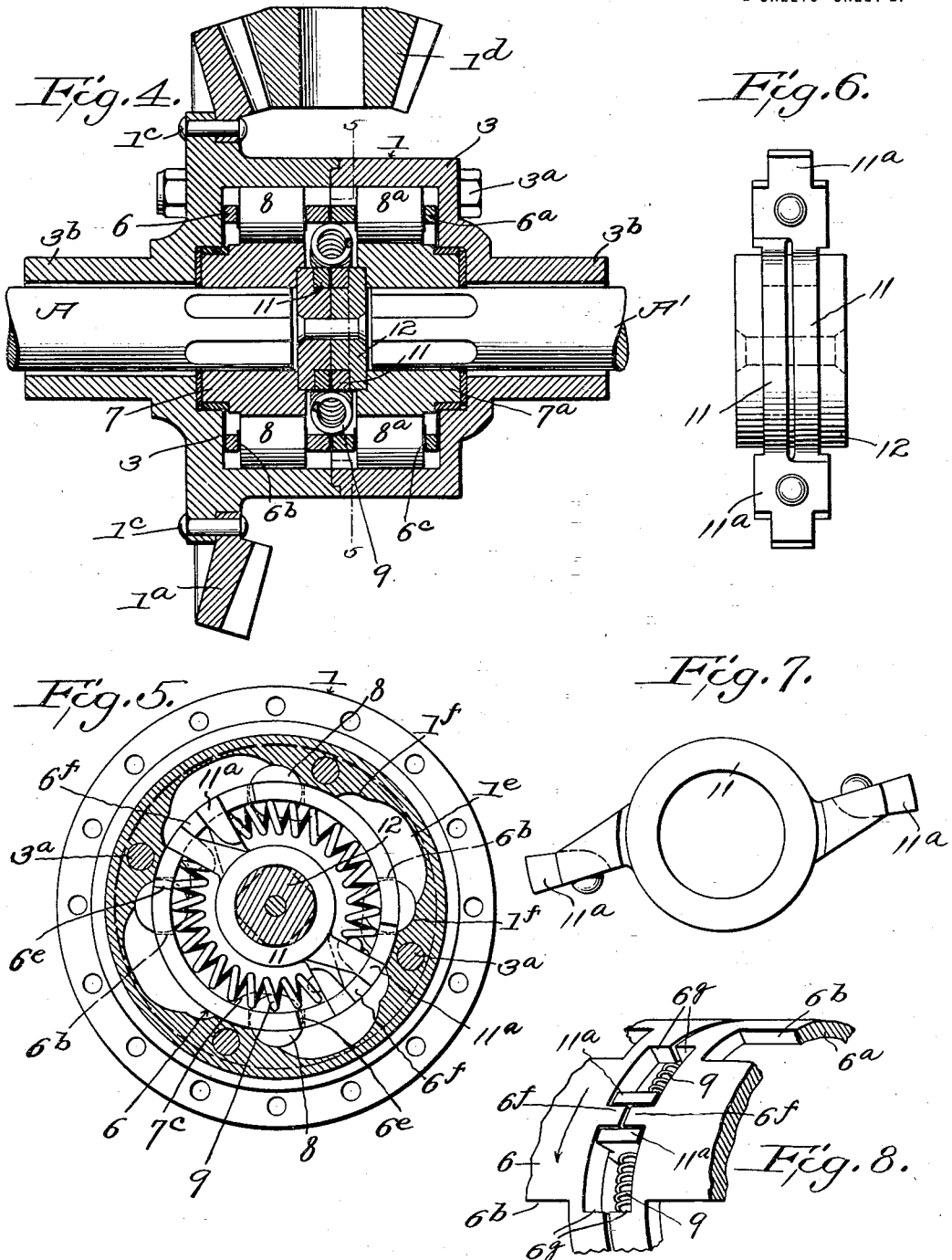

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

DIFFERENTIAL MECHANISM.

1,175,300.   Specification of Letters Patent.   Patented Mar. 14, 1916.

Application filed April 12, 1912. Serial No. 690,360.

*To all whom it may concern:*

Be it known that I, DAVID E. Ross, of La Fayette, in the county of Tippecanoe and State of Indiana, have invented certain new and useful Improvements in Differential Mechanism; and I hereby declare that the following is a full, clear, and exact description thereof, reference being had to the accompanying drawings, which form part of this specification.

This invention is a novel improvement in differential mechanism and its object is to provide a differential mechanism wherein one driven member cannot or will not race if less resistance should be offered thereto than to the other member; for example, if the mechanism is used to drive the rear wheels of an automobile, one driven wheel cannot race if it finds a soft place; and thus all the motive power can be utilized for effective tractive purposes, and not be wasted in driving any part idly.

Another object is to provide a differential mechanism containing the invention which can be substituted for or used in place of certain types of differential mechanism now in use with the advantage of economizing motive power and preventing racing as above noted.

I will explain the invention in detail as embodied in the differential mechanism illustrated in the accompanying drawings in which—

Figure 1 is a central longitudinal sectional view through a differential mechanism embodying the invention. Fig. 2 is a vertical transverse section on the line 2—2, Fig. 1. Fig. 3 is a side view of the roller cages. Fig. 4 is a longitudinal sectional elevation of such a mechanism provided with cage controlling springs. Fig. 5 is a transverse section on line 5—5, Fig. 4. Fig. 6 is a detail view of the cage-controlling castings shown in Figs. 4 and 5. Fig. 7 is a side view of one of such castings. Fig. 8 is a detail perspective view illustrating the operation of the cage-controlling devices.

Referring to Figs. 1 and 2 of the drawings, 1 designates a differential housing or casing which is in the form of a cylinder closed at its ends by heads 3 which are fitted to the ends of the housing and secured rigidly thereto by means of longitudinal bolts $3^a$. These heads are provided with axially alined hubs or bearings $3^b$ for the inner ends of the shaft or axle sections A, A′, hereinafter referred to.

The housing 1 is adapted to be rotated axially by any suitable means. As shown a bevel gear $1^a$ is secured thereto by means of bolts $1^c$; and this gear $1^a$ may be driven by means of a pinion $1^d$ connected to the engine shaft, (not shown) or any other suitable driver. The particular means for rotating the housing 1 forms no part of the present invention.

Within the casing 1 are a pair of adjacent disks 7, $7^a$ which are respectively keyed or otherwise fitted to the ends of the shaft sections A, A′, so that they cannot rotate relatively thereto. Each disk, 7, $7^a$, is provided with a plurality of pockets $7^c$ in its periphery; and normally resting in the pockets of the disk 7 are rollers 8, and in the pockets of disk $7^a$ are rollers $8^a$. These rollers lie between the disks 7, $7^a$ and the interior wall of the housing and project from the pocket $7^c$ into corresponding pocket $1^e$ in the inner periphery of the housing 1. The pockets $1^e$ in the housing are longer circumferentially than the pockets $7^c$ in the disks, and consequently as the housing turns each roller 8, $8^a$ will eventually be caught between the following end of a pocket $1^e$ in the casing and the leading end of a pocket $7^c$ in its disk, as indicated in Fig. 2; and the rollers thus form a clutch or lock between the casing and the disks, and transmit motion from the housing 1 to the disks in the direction in which the housing rotates.

The pockets $1^e$ in the housing preferably have contracted extensions at their ends, as indicated at $1^f$, which fit the side of the rollers and afford broad bearing surfaces for the rollers 8, $8^a$ when the housing is locked to the disks by the rollers. If either disk moves to an intermediate position, so that the pocket $7^c$ therein registers about centrally with the pockets $1^e$ of the housing, then the roller 8, (or $8^a$) in the disk would project into pockets $1^e$ as indicated in dotted lines in Fig. 2 and would not transmit motion from the housing to the disks, or vice versa.

To prevent excessive rotary movement of one disk relative to the other each set of rollers is kept properly spaced apart by a cage. As shown the rollers 8 are spaced apart by a cage 6 which may consist of an annular band slightly larger in diameter than the disk 7 and fitted loosely thereover and provided with openings 6<sup>b</sup> to accommodate the rollers 8, and which while permitting each roller to freely rotate, keeps them properly spaced apart. The openings 6<sup>b</sup> in cage 6 correspond in location to the pockets 7<sup>c</sup> in the disk 7. The rollers 8<sup>a</sup> are similarly spaced apart by being placed in openings 6<sup>c</sup> in a cage 6<sup>a</sup> loosely fitted over the disk 7<sup>a</sup>.

The cages 6 and 6<sup>a</sup>, see Fig. 3, are provided at their inner ends with lugs 6<sup>d</sup> and recesses 6<sup>e</sup>; the lugs 6<sup>d</sup> of one cage project into the recesses 6<sup>e</sup> of the opposed cage. The recesses are of greater circumferential extent than the lugs so as to permit one cage to move circumferentially for a limited extent relatively to the other; but in the normal position of the parts, lugs 6<sup>d</sup> lie in the center of the recesses 6<sup>e</sup>. The action of these lugs is hereinafter explained.

Under normal conditions with the parts constructed and arranged as shown in Figs. 1 and 2; when the housing 1 is driven it causes disks 7, 7<sup>a</sup> to rotate by reason of the rollers 8, 8<sup>a</sup> in the pockets of the disks engaging with the opposed shoulders of the pockets 1<sup>e</sup> of the housing 1. Assuming for instance that the device is used on an automobile and that the axles A, A' are connected to the respective driving wheels at opposite sides of the vehicle; when the vehicle turns, one drive wheel will necessarily have to travel faster than the other, and in such case assuming that the disk 7 is connected with the faster wheel, it would advance or rotate ahead of the disk 7<sup>a</sup> until the following side of the pocket 7<sup>c</sup> engaged the rollers 8 and forced these rollers forward toward the center of the pockets 1<sup>e</sup> in the housing, at which time the lugs 6<sup>d</sup> on the cage 6 would engage the forward end of the recesses 6<sup>e</sup> in the cage 6<sup>a</sup>. The cage 6<sup>a</sup> however will be prevented from rotating because the rollers 8<sup>a</sup> which are fitted in the pockets therein are then driving the whole load and locked between the forward ends of the pocket 7<sup>c</sup> in disk 7<sup>a</sup> and the following of the pockets 1<sup>e</sup> in the housing. Under these conditions therefore rollers 8 will assume a position indicated in dotted lines in Fig. 2, out of contact with the ends of pockets 1<sup>e</sup> of the housing, and rotate idly; and the disk 7 could then rotate past said rollers 8 which cannot advance any farther toward the leading end of the pockets 1<sup>e</sup> in the housing because cage 6 is prevented from moving forward by the interlocking lugs and recesses on the cages 6, 6<sup>a</sup>; the disk 7 however is free to advance any fraction of a revolution or number of revolutions. But when the vehicle has turned a curve and is again going directly forward, and the wheels turn at a uniform speed the rollers 8 will drop into the pockets 7<sup>c</sup> in disks 7 and be again engaged by the following edges of the pockets 1<sup>e</sup> in the housing 1, as indicated in full lines, and transmit motion from the housing 1 to the disk 7 and connected wheels. With this compensating mechanism the wheel on the solid ground is always doing the driving and it is impossible for the wheel in slippery places to race and absorb the power of the driving mechanism. If the wheel attached to axle A' should be the faster wheel in turning the corner then the rollers 8<sup>a</sup> disk 7<sup>a</sup> and cage 6<sup>a</sup> would operate in the same manner as the rollers 8, disks 7 and cage 6 above described.

It can readily be seen that the parts 6 and 6<sup>a</sup> (which are duplicates of each other) can have but a limited amount of rotation with respect to each other, as the lugs of one are arranged to engage the recesses of the other. Supposing the rollers in 6 were driving and the rollers in 6<sup>a</sup> should force 6<sup>a</sup> to rotate ahead of 6; immediately the lug on 6<sup>a</sup> will engage the wall of the recess in 6 and the wall of the recess in 6<sup>a</sup> will engage the lug on 6 thus preventing any additional relative rotation of one with respect to the other. If 6 is held in a definite position by the rollers which it contains, on account of such rollers being engaged with the housing and disk 7, then the rollers in 6<sup>a</sup> cannot advance far enough to come in contact with the forward wall of pockets 1<sup>e</sup> and cause any interlocking action in that direction. When the rollers pass out into the pockets 1<sup>e</sup> there is no tendency on the part of such rollers to cause any additional rotation of cage 6<sup>a</sup> with respect to 6. If, however, the vehicle should race on ahead of the motive power, then both cages will permit their rollers to go ahead and lock in the forward position. This is equally true where the driving mechanism is reversed.

If the car is to be run at such a speed that the centrifugal force might be greater than the weight of the rollers and tending to hold them out in the pockets 1<sup>e</sup>, then it may be advisable to use a spring-controlling device to force the cages 6 and 6<sup>a</sup> into alinement.

One spring means for controlling the relative position of the cages 6, 6<sup>a</sup> is shown in Figs. 4 and 5. In this construction the cages 6, 6<sup>a</sup> are provided on their adjacent edges with opposite projecting lips 6<sup>f</sup>, see Fig. 8; and between and within the cages and intermediate the disks 7, 7<sup>a</sup> are placed two castings (Fig. 7) each comprising an annular ring 11 having diametrically opposite radially projecting arms 11<sup>a</sup>, which castings are duplicates so that they can be fitted together as indicated in Fig. 6 and when so fitted together arms 11<sup>a</sup> of one casting will come opposite similar arms of the opposite casting and form a kind of X-lever. The annular parts 11 are rotatably mounted upon circular plates 12 which may be axially confined between the disks 7, 7<sup>a</sup> and supported in annular recesses in the inner faces of said disks 7, 7ᵃ (see Fig. 4). The opposed arms 11ᵃ of the castings 11 engage the opposite sides of the lugs 6ᶠ of the cages 6, 6ᵃ (see Fig. 8); and between the arms 11ᵃ of one casting 11 and the diametrically opposite arms 11ᵃ of the other casting 11 are placed helical expansion springs 9 (Figs. 4 and 5). When the parts are so arranged if cage 6 should rotate ahead of cage 6ᵃ in the direction indicated by the arrow (Fig. 8) then the adjacent arm 11ᵃ would be forced forward until it engages the leading edge 6ᵍ of the recess in the cage 6ᵃ, which will prevent any further rotation of the cage 6. It will be seen by reference to Fig. 5 that such movement of one cage will put springs 9 under compression and therefore said springs will return the displaced cage to normal position as soon as the disturbing pressure on either cage is released, and this will bring the openings in cages 6, 6ᵃ into alinement and both sets of rollers 8, 8ᵃ will be brought into effective operative position.

In the construction shown in Fig. 4 the housing is shown as divided centrally into two parts, secured together by bolts; but with the exception of having the disks 7, 7ᵃ separated sufficiently to enable the cage controlling devices to be inserted therebetween, the construction is similar in purpose, effect and operation to that already described.

In case one wheel should run faster than the other, as in turning a corner, the related disk and its rollers are forced forward by the differential wheel making the gain but the rollers, being in a cage, can be advanced only as far as such cage can advance; and such cage is stopped by the other cage which is surrounding the other driving rollers (see Figs. 3 and 8). The advanced rollers are then forced into the outer pockets 1ᵉ as indicated in dotted lines in Fig. 2. For low speed differential mechanism where the centrifugal force would not be abnormal, no spring returning mechanism would be necessary, but for high speed differential mechanism the rollers would have a tendency to stay in the outer pockets, so it becomes necessary to provide some spring mechanism for returning the displaced rollers to normal position.

Running under normal conditions the rollers 8, 8ᵃ will be in alinement. When a corner is reached, the inner slower wheel will be driven; while the outer wheel, traversing the most territory, will idly gain the required amount; but will immediately be driven as soon as the corner is turned, or the disturbing factor removed.

What I claim is:

1. In a differential mechanism, the combination of a housing, a pair of disks mounted axially within said housing, and clutch devices interposed between the disks and housing and adapted to lock them together, a means surrounding each disk and keeping the clutch devices thereof in proper relative position, and devices whereby one of said means limits the relative rotary displacement of the other set.

2. In a differential mechanism, the combination of a housing, a pair of disks mounted axially within said housing, and clutch rollers interposed between the disks and housing and adapted to lock them together, a cage surrounding each disk and keeping the rollers thereof in proper relative position, and means whereby one cage limits the relative rotary displacement of the other.

3. In a differential mechanism, the combination of a housing provided with a series of pockets in its interior; a pair of disks mounted axially of and within said housing and provided with pockets in their periphery; clutch devices in the pockets of the disks adapted to project into the pockets of the housing and to lock the disks to the housing; a means operating with each disk for keeping the clutch devices thereof properly spaced apart; one means limiting the relative displacement of the other means.

4. In a differential mechanism, the combination of a housing, a pair of disks mounted axially within said housing, and clutch devices interposed between the disks and housing and adapted to lock them together, a cage surrounding each disk and keeping the clutch devices thereof in proper relative position, and spring-controlled devices for returning a displaced cage to normal position.

5. In a differential mechanism, the combination of a housing; a pair of disks mounted axially within said housing; clutch rollers interposed between the disks and housing and adapted to lock them together; means for keeping the rollers of each disk in proper relative position, means whereby one set of rollers limits the relative rotary displacement of the other set; and springs for returning a displaced set of rollers to normal position.

6. In a differential mechanism, the combination of a housing provided with a series of pockets on its interior and a pair of disks mounted axially of and within said housing and provided with pockets in their periphery, rollers in the pockets of the disks and adapted to project into the pockets of the housing and to lock the disks to the housing; cages for keeping the rollers in each disk properly spaced apart; and means whereby one cage limits the displacement of the other cage.

7. In a differential mechanism, the combination of a housing having interior pockets, a pair of disks axially mounted within said housing and provided with pockets; clutch devices in the pockets of the disks adapted to project into the pockets of the housing, a slotted cage surrounding each disk and spacing the clutch devices apart, and means for limiting the relative rotary displacement of the cages.

8. In a differential mechanism, the combination of a housing having an annular series of pockets in its inner periphery, means for driving the housing; a pair of axially alined disks mounted axially within the housing and provided with peripheral pockets; rollers in the pockets of the disks and housing adapted to lock the disks to the housing; an annular slotted cage surrounding each disk and provided with slots for the accommodation of the related rollers; and means for limiting the relative rotary displacement of the cages.

9. In a differential mechanism, the combination of a housing having interior pockets; a pair of disks axially mounted within said housing and provided with pockets; clutch devices in the pockets of the disks adapted to project into the pockets of the housing, a slotted cage surrounding each disk and spacing the clutch devices apart; and spring-controlled means for normally holding the cages with the clutch devices in alinement and for returning the displaced cage to normal position.

10. In a differential mechanism, the combination of a housing having an annular series of pockets in its inner periphery; means for driving the housing; a pair of axially alined disks mounted axially within the housing and provided with peripheral pockets; rollers placed in the pockets of the disks and housing adapted to lock the disks to the housing; and an annular slotted cage surrounding each disk and provided with slots for the accommodation of the related rollers; with spring-controlled devices for normally holding the cages in alinement, and for returning the displaced cage into alinement.

11. In a differential mechanism, the combination of a housing, a pair of disks mounted axially within said housing, and clutch devices interposed between the disks and housing and adapted to lock them together, a cage surrounding each disk and keeping the clutch devices thereof in proper relative position, and spring-controlled devices for returning a displaced cage to normal position; said devices comprising a pair of pivoted X-levers arranged intermediate the disks the opposite levers engaging opposite sides of adjacent lugs on the cages, and springs interposed between the opposite ends of opposite levers to close the X-members.

12. In a differential mechanism, the combination of a housing having an annular series of pockets in its inner periphery, means for driving the housing, a pair of axially alined disks mounted axially within the housing and provided with peripheral pockets, rollers placed in the pockets of the disks and housing adapted to lock the disks to the housing, and an annular slotted cage surrounding each disk and provided with slots for the accommodation of the related rollers, with devices for normally holding the cages in alinement, and for returning the displaced cage into alinement; said devices comprising a pair of pivoted X-levers arranged intermediate the disks the opposite levers engaging opposite sides of adjacent lugs on the cages, and springs interposed between the opposite ends of opposite levers to close the X-members.

13. In a differential mechanism, the combination of a housing; a pair of members mounted axially within said housing; clutch rollers interposed between the members and housing and adapted to lock them together; and means whereby one set of rollers limits the relative rotary displacement of the other set; and means for returning a displaced set of rollers to normal position.

In testimony that I claim the foregoing as my own, I affix my signature in presence of two witnesses.

DAVID E. ROSS.

Witnesses:
  Edward A. Ross,
  Wm Ross.